(12) United States Patent
Hanisch

(10) Patent No.: US 6,825,656 B2
(45) Date of Patent: Nov. 30, 2004

(54) POSITION DETECTION DEVICE FOR A LINEAR DRIVE

(75) Inventor: Christoph Hanisch, Esslingen (DE)

(73) Assignee: Festo AG & Co., Esslingen (DE)

( * ) Notice: Subject to any disclaimer, the term of this patent is extended or adjusted under 35 U.S.C. 154(b) by 18 days.

(21) Appl. No.: 10/265,069

(22) Filed: Oct. 4, 2002

(65) Prior Publication Data

US 2003/0067297 A1 Apr. 10, 2003

(30) Foreign Application Priority Data

Oct. 9, 2001 (DE) .................................. 201 16 564 U

(51) Int. Cl.[7] .............................................. G01R 7/14
(52) U.S. Cl. ............................. 324/207.2; 324/207.24
(58) Field of Search ....................... 324/207.2, 207.21, 324/207.24, 165, 173, 174

(56) References Cited

U.S. PATENT DOCUMENTS

| | | | | |
|---|---|---|---|---|
| 4,673,827 A | * | 6/1987 | Sommer ................. 307/116 |
| 4,883,150 A | * | 11/1989 | Arai ........................ 188/289 |
| 4,982,155 A | * | 1/1991 | Ramsden .............. 324/207.2 |
| 5,103,172 A | | 4/1992 | Stoll |
| 5,383,284 A | | 1/1995 | Rieder |
| 5,440,183 A | | 8/1995 | Denne |
| 5,514,961 A | | 5/1996 | Stoll et al. |
| 5,606,256 A | * | 2/1997 | Takei .................... 324/207.21 |
| 6,100,681 A | * | 8/2000 | Tsuruta ................. 324/207.2 |
| 6,533,596 B2 | * | 3/2003 | Demuth et al. ............. 439/320 |
| 6,586,927 B2 | * | 7/2003 | Pfeil et al. ............... 324/207.2 |

FOREIGN PATENT DOCUMENTS

| | | |
|---|---|---|
| DE | 3923063 A1 | 10/1990 |
| DE | 4337373 C2 | 5/1994 |
| DE | 4306539 C2 | 9/1994 |
| DE | 4334811 A1 | 4/1995 |
| DE | 19947997 A1 | 5/2000 |
| EP | 0985831 A2 | 3/2000 |

* cited by examiner

Primary Examiner—Jay Patidar
(74) Attorney, Agent, or Firm—Hoffmann & Baron, LLP

(57) ABSTRACT

A position detection device for detecting several positions of a structural component, which can move along a guide track by means of a sensor device that can be fixed to the guide track is suggested that comprises at least a first position sensor element (10) which extends along a partial range of the guide track for continuous position detection, and which is permanently connected via a flexible signal conductor arrangement (11) to at least one second position sensor element (12). One of the sensor elements (10) comprises a sensor signal connection (13) for the signals of all sensor elements (10,12) so that only one sensor cable (15) is required.

13 Claims, 1 Drawing Sheet

POSITION DETECTION DEVICE FOR A LINEAR DRIVE

The application claims priority from Application No. 201 16 564.3 filed on Oct. 9. 2001.

FIELD OF THE INVENTION

The invention concerns a position detection device for detecting several positions of a structural component, which move along a guide track, by means of a sensor device that can be fixed to the guide track and that comprises at least a first position sensor element extending along a partial length of the guide track for continuous position detection.

BACKGROUND OF THE INVENTION

DE 201 06 298 U1 discloses such a position detection device for a pneumatic linear drive in which position sensor elements designed as path measuring systems are arranged along the two end areas of the guide track for the continuous detection of positions in these end areas. Each position sensor element comprises a sensor signal connector designed as a threaded connector for the connection of appropriate sensor cables. The two sensor cables and other optional sensor cables in the case of other position sensor elements along the guide track require complicated installation. The plurality of sensor cables often proves to be problematic, especially in the case of moving devices. In addition, problems and defects can occur if the sensor cables are not clearly identified.

SUMMARY OF THE INVENTION

One problem addressed by the present invention is to create a position detection device that requires only one sensor cable, can detect several positions, is simple, economical and can be readily assembled.

The invention solves this problem in that the first position sensor element is permanently connected via a flexible signal conductor arrangement to at least one second position sensor element and that one of the sensor elements comprises a sensor signal connector for the signals of all sensor elements.

The position detection device of the invention has the advantage that, on the one hand, only one sensor cable is required for at least two position sensor elements and that these position sensor elements can be positioned as desired in a simple manner by the flexible signal conductor arrangement connecting them and their position change without electrical connections having to be set up or modified. This results in a very robust arrangement that is not susceptible to problems and that can also be made moisture-proof in a relatively simple manner.

The sensor signal connector is advantageously designed as a plug connector or a threaded connector.

The second position sensor element can also be designed as a position sensor element for continuous position detection extending along a partial range of the guide track; however, it is frequently sufficient to carry out the more complicated path measuring only at one end area of the guide track while on the other end area a simple position switch element for detecting the end position is sufficient. As a consequence of its larger geometric extension, the first position sensor element is advantageously provided with the sensor signal connection, especially if the second position sensor element is designed as a position switch element.

The position sensor elements are preferably designed to be sensitive to magnetic fields whereas the movable component is or carries a permanent magnet. A Reed switch or Hall switch is preferably suitable as the position switch element.

In order to facilitate the installation and wiring, the flexible signal conductor arrangement advantageously comprises a variable linear extension and is designed especially as a spiral cable.

For fixing to the guide track, the position sensor elements are designed to be pushed or inserted into a groove, which runs along the guide track, preferably designed as a T-groove, in which case the position sensor elements have a corresponding T-shaped cross section. This design also contributes to a rapid and simple fixing of the position sensor elements.

The position detection device is particularly suited for a linear drive formed by the movable component and the guide track. The movable component is preferably designed as a piston that can move in a cylinder.

For positioning and fixing in the desired positions the position sensor elements comprise means for a variable fixing to the guide track that are designed in particular as fixing screws. This also makes possible a rapid and simple repositioning.

A signal preparation device and/or signal evaluation device and/or a bus terminal is/are advantageously arranged in one of the two position elements, preferably in the position sensor element provided with the sensor signal connection.

An embodiment example of the invention is shown in the drawing and explained in detail in the following description.

DETAILED DESCRIPTION OF THE PREFERRED EMBODIMENTS

Figure 1:
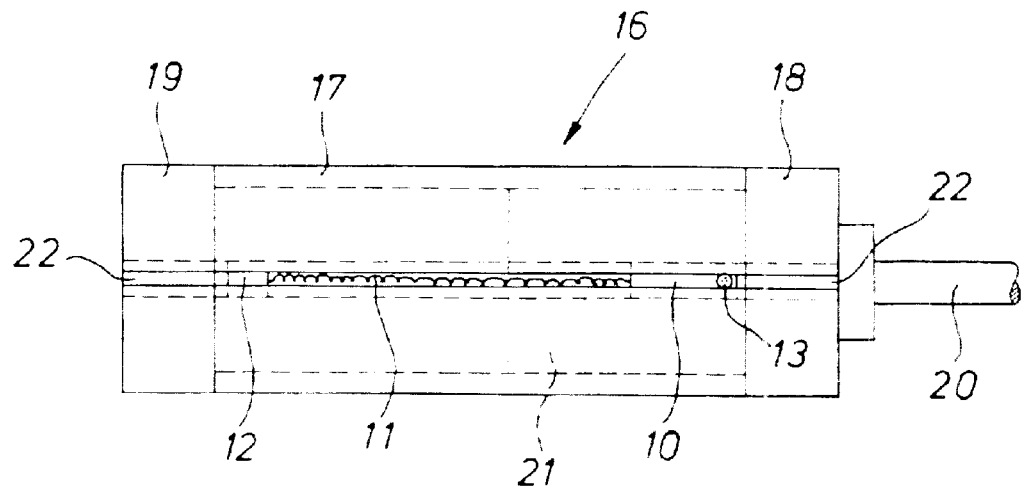
FIG. 1 shows a top view of a position detection device arranged in a working cylinder as an embodiment example of the invention.
Figure 2:
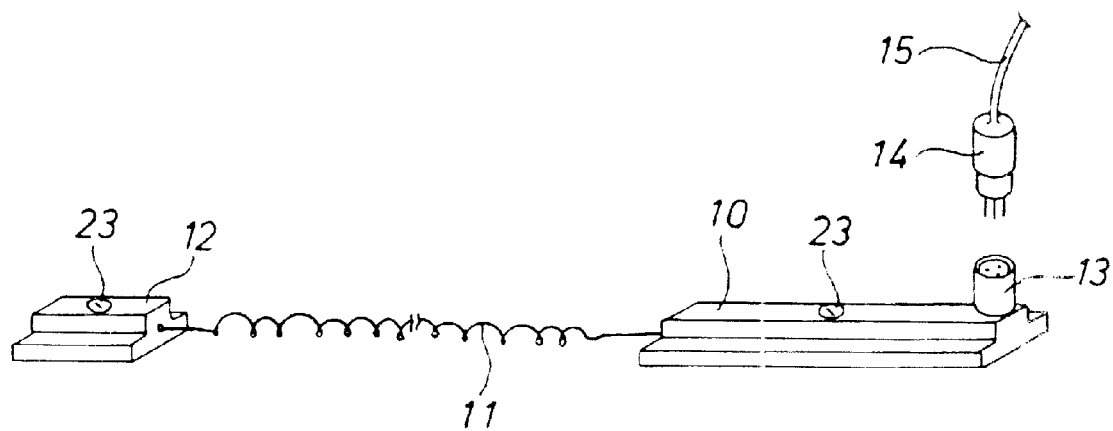
FIG. 2 shows a perspective view of the position detection device consisting of two position sensor elements in the disassembled state.

The position detection device shown in FIGS. 1, 2 as an embodiment example consists of a first position sensor element 10 that extends over a certain path length and contains a path measuring system for the continuous detection of positions along this path stretch. This first position sensor element 10 is permanently connected to a second position sensor element 12 designed for detecting a certain position via flexible signal conductor arrangement 11 designed as a spiral cable. The two position sensor elements 10, 12 are designed as elements sensitive to magnetic fields and for detecting the position of a magnet that can be moved past them, especially a permanent magnet. For example, second position sensor element 12 is designed as a Reed switch or a Hall switch. First position sensor element 10 designed as a path measuring system can comprise, e.g., a series of position switch elements or it can comprise another known type of path measuring systems, e.g., a DGBi path measuring system.

First position sensor element 10 comprises plug connector 13 for receiving plug 14 of sensor cable 15 in order to supply the sensor signals of the two position sensor elements 10, 12 to an external control, regulation or display device. To this end, the sensor signals from second position sensor element 12 are fed via flexible signal conductor arrangement 11 to first position sensor element 10 and then passed through to plug connector 13, which also comprises connections for the sensor signals of first position sensor element 10.

Alternatively, first position sensor element 10 can also contain a bus terminal to which the signal leads of both position sensor elements 10, 12 are connected. Here, sensor cable 15 comprises a data bus that can be connected to this bus terminal for transmitting the sensor signals.

First position sensor element 10 can alternatively or additionally also comprise a signal conditioning device and/or signal evaluation device for the sensor signals, which otherwise would be externally arranged. This makes it possible for already conditioned sensor signals or sensor signals brought to a certain standard to be transmitted via sensor cable 15. When such electronic arrangements are arranged in first position sensor element 10, sensor cable 15 can also comprise the necessary power supply for the operating voltage.

In an alternative embodiment, second position sensor element 12 can, of course, also comprise a path measuring system instead of a position switch. Furthermore, another position sensor element or other position sensor elements can be connected via appropriate, flexible signal conductor arrangements 11 to first position sensor element 10 and/or to second position sensor element 12. Plug connector 13 serves to transmit all sensor signals.

Plug connector 13 can also be designed as a threaded connector or another connector for electrically connecting the sensor leads to sensor cable 15. Alternatively, a wireless sensor signal connector can also be provided, via which the sensor signals of all position sensor elements are transmitted wirelessly to an external receiving station, e.g., by phototransmission or infrared transmission, radio transmission, etc.

FIG. 1 shows a fluid-activated linear drive 16 comprising an oblong housing with tubular central part 17 and two housing covers 18, 19 arranged on the front sides of central part 17.

Piston 21 connected to piston rod 20 is guided in such a way that it can move axially within tubular central part 17. The fluid supply lines for actuating piston 21 are not shown for the sake of clarity. On the whole, linear drive 16 can be a single-acting or double-acting working cylinder.

Tubular central part 17 forms the guide track for piston 21 designed as a movable component. This tubular central part 17 comprises longitudinally running T groove 22, which is radially open to the outside and forms an extension over housing covers 18, 19. The two position sensor elements 10, 12, which have an appropriate cross section, can be pushed from the one side or the other side into this T groove 22. Fixing screws 23 are used for fixing; however, in principle, other known fixing means can also be used. Flexible signal conductor arrangement 11, which can be adapted in length, thus comes to rest in T groove 22 and remains there as a result of its design as a spiral cable even when the interval between the two position sensor elements 10, 12 changes.

Instead of a T groove 22, other groove forms known for such purposes can be used, e.g., wedge-shaped or dove-tail-like cross sections that prevent radial movement of position sensor elements 10, 12 toward the outside.

Piston 21 comprises a permanent magnet (not shown) that generates the appropriate position sensor signals in position elements 10, 12 in their particular effective range. If position sensor elements 10, 12 comprise, e.g., magnetic coil arrangements, piston 21 can also comprise a ferromagnetic element to generate the sensor signals or it can be constructed ferromagnetically.

What is claimed is:

1. A position detection device that can be fixed to a guide track for detecting several positions of a structural component movable along the guide track, the position detection device comprising at least a first position sensor element that extends along a partial length of the guide track for continuous position detection, the first position sensor element being permanently connected via a flexible signal conductor arrangement to at least one second position sensor element spaced apart from the first position sensor element along the guide track, wherein one of the sensor elements comprises a sensor signal connector for the signals of all sensor elements and wherein at least one of the sensor elements is movable along the guide track to a desired position.

2. The position detection device according to claim 1, characterized in that the sensor signal connector is designed as a plug connector or a threaded connector.

3. The position detection device according to claim 1, characterized in that the second position sensor element is designed as a position switch element or also as a position sensor element that extends along a partial length of the guide track for continuous position detection.

4. The position detection device according to claim 3, characterized in that the first position sensor element is provided with the sensor signal connection and that the second position sensor element is designed as a position switch element.

5. The position detection device according to claim 1, characterized in that the position sensor elements are designed as elements sensitive to magnetic fields and that the movable structural component is or carries a permanent magnet.

6. The position detection device according to claim 5, characterized in that the second position sensor element, designed as a position switch element, is designed as a Reed switch or a Hall switch.

7. The position detection device according to claim 1, characterized in that the flexible signal conductor arrangement can be variably extended in length and is designed in particular as a spiral cable.

8. The position detection device according to claim 1, characterized in that the position sensor elements are designed for being pushed into or inserted into a groove running along the guide track.

9. The position detection device according to claim 1, characterized in that the movable structural component and the guide track form a linear drive.

10. The position detection device according to claim 9, characterized in that the movable structural component is designed as a piston that can move in a cylinder.

11. The position detection device according to claim 1, wherein the position sensor elements comprise means for adjustably fixing the position sensor elements to the guide track.

12. The position detection device according to claim 1, characterized in that a signal conditioning device and/or signal evaluation device and/or a bus terminal is/are arranged in one of the position sensor elements.

13. A position detection device for detecting several positions of a structural component, that which can move along a guide track, by means of a sensor device that can be fixed to the guide track and that comprises at least a first position sensor element that extends along a partial length of the guide track for continuous position detection, characterized in that the first position sensor element is permanently connected via a flexible signal conductor arrangement to at least one second position sensor element and that one of the sensor elements comprises a sensor signal connector for the signals of all sensor elements, and wherein the position sensor elements are designed for being pushed into or inserted into a groove running along the guide track, and wherein the groove is designed as a T groove and that the position sensor elements have a T-shaped cross section adapted to said groove.

* * * * *